United States Patent
Uotsu

(10) Patent No.: US 10,656,265 B2
(45) Date of Patent: May 19, 2020

(54) MINING WORK MACHINE

(71) Applicant: HITACHI CONSTRUCTION MACHINERY CO., LTD., Tokyo (JP)

(72) Inventor: Shinichi Uotsu, Tsuchiura (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 270 days.

(21) Appl. No.: 15/756,260

(22) PCT Filed: Mar. 13, 2017

(86) PCT No.: PCT/JP2017/010045
§ 371 (c)(1),
(2) Date: Feb. 28, 2018

(87) PCT Pub. No.: WO2017/159639
PCT Pub. Date: Sep. 21, 2017

(65) Prior Publication Data
US 2018/0252810 A1 Sep. 6, 2018

(30) Foreign Application Priority Data
Mar. 14, 2016 (JP) .................................. 2016-049730

(51) Int. Cl.
*G01S 13/931* (2020.01)
*G01S 13/72* (2006.01)
(Continued)

(52) U.S. Cl.
CPC ............ *G01S 13/931* (2013.01); *G01S 7/412* (2013.01); *G01S 7/415* (2013.01); *G01S 13/726* (2013.01);
(Continued)

(58) Field of Classification Search
CPC .......... G08G 1/166; G08G 1/16; G08G 1/165; G08G 1/00; G08G 1/0962; G08G 1/0969;
(Continued)

(56) References Cited

U.S. PATENT DOCUMENTS 6,052,079 A * 4/2000 Kitahara ................. G01S 7/414
342/70
9,420,203 B2 * 8/2016 Broggi .................. G01S 17/023
(Continued)

FOREIGN PATENT DOCUMENTS

JP 2009-271086 A 11/2009
JP 2011-002368 A 1/2011
(Continued)

OTHER PUBLICATIONS

International Search Report of PCT/JP2017/010045 dated May 9, 2017.

*Primary Examiner* — Olumide Ajibade Akonai
(74) *Attorney, Agent, or Firm* — Mattingly & Malur, PC

(57) ABSTRACT

A mining work machine includes an obstacle determination device connected to a periphery detection device. If measurement points detected by the periphery detection device in a current cycle are equal to or greater than predetermined size thresholds equivalent in size to the mining work machine, these measurement points are put into a single obstacle candidate group. Based on relative speeds of the obstacle candidate at the measurement points and a traveling speed of the mining work machine, it is determined whether the obstacle candidate is a stationary object or a moving object, and whether the stationary object has been also detected by the periphery detection device in a preceding cycle. If a position of detection of the stationary object detected for the first time is equal to or smaller than a non-obstacle determination distance threshold, the obstacle
(Continued)

determination device outputs the obstacle candidate as a non-obstacle.

3 Claims, 18 Drawing Sheets

(51) Int. Cl.
*G01S 7/41* (2006.01)
*E21C 47/00* (2006.01)
*G08G 1/16* (2006.01)

(52) U.S. Cl.
CPC .......... *E21C 47/00* (2013.01); *G01S 2013/932* (2020.01); *G01S 2013/93271* (2020.01); *G01S 2013/93274* (2020.01); *G01S 2013/93275* (2020.01); *G01S 2013/93276* (2020.01); *G08G 1/161* (2013.01); *G08G 1/166* (2013.01)

(58) Field of Classification Search
CPC .. G08G 1/167; G08G 1/017; G08G 1/096716; G08G 1/096725; G01S 13/931; G01S 2013/9375; G01S 17/936; G01S 2013/9353; G01S 13/88; G01S 13/04; G01S 13/86; G01S 2013/9332; G01S 17/023; G01S 2013/9389; G01S 2013/9346; G01S 2013/9385; G01S 7/412; G05D 2201/021; G05D 1/0257; G05D 1/0223; G05D 1/0055; G05D 2201/0213; G05D 1/0088; B60W 2300/125; B60W 2550/10; B60P 3/00; G06K 9/00805

See application file for complete search history.

(56) References Cited

U.S. PATENT DOCUMENTS

| | | | |
|---|---|---|---|
| 10,124,805 B2 * | 11/2018 | Kou | B60K 17/35 |
| 2002/0003489 A1 * | 1/2002 | Samukawa | G01S 17/42 |
| | | | 342/70 |
| 2005/0093735 A1 | 5/2005 | Samukawa et al. | |
| 2013/0147958 A1 * | 6/2013 | Mitsuta | B60R 1/00 |
| | | | 348/148 |
| 2014/0233790 A1 | 8/2014 | Chen et al. | |
| 2014/0368493 A1 * | 12/2014 | Rogan | G01S 17/50 |
| | | | 345/419 |
| 2016/0042645 A1 | 2/2016 | Harada et al. | |
| 2016/0202351 A1 | 7/2016 | Uotsu | |

FOREIGN PATENT DOCUMENTS

| | | |
|---|---|---|
| JP | 2014-202709 A | 10/2014 |
| JP | 2015-155883 A | 8/2015 |
| JP | 2016-024685 A | 2/2016 |
| WO | 2011/130861 A1 | 10/2011 |
| WO | 2014/167680 A1 | 10/2014 |

* cited by examiner

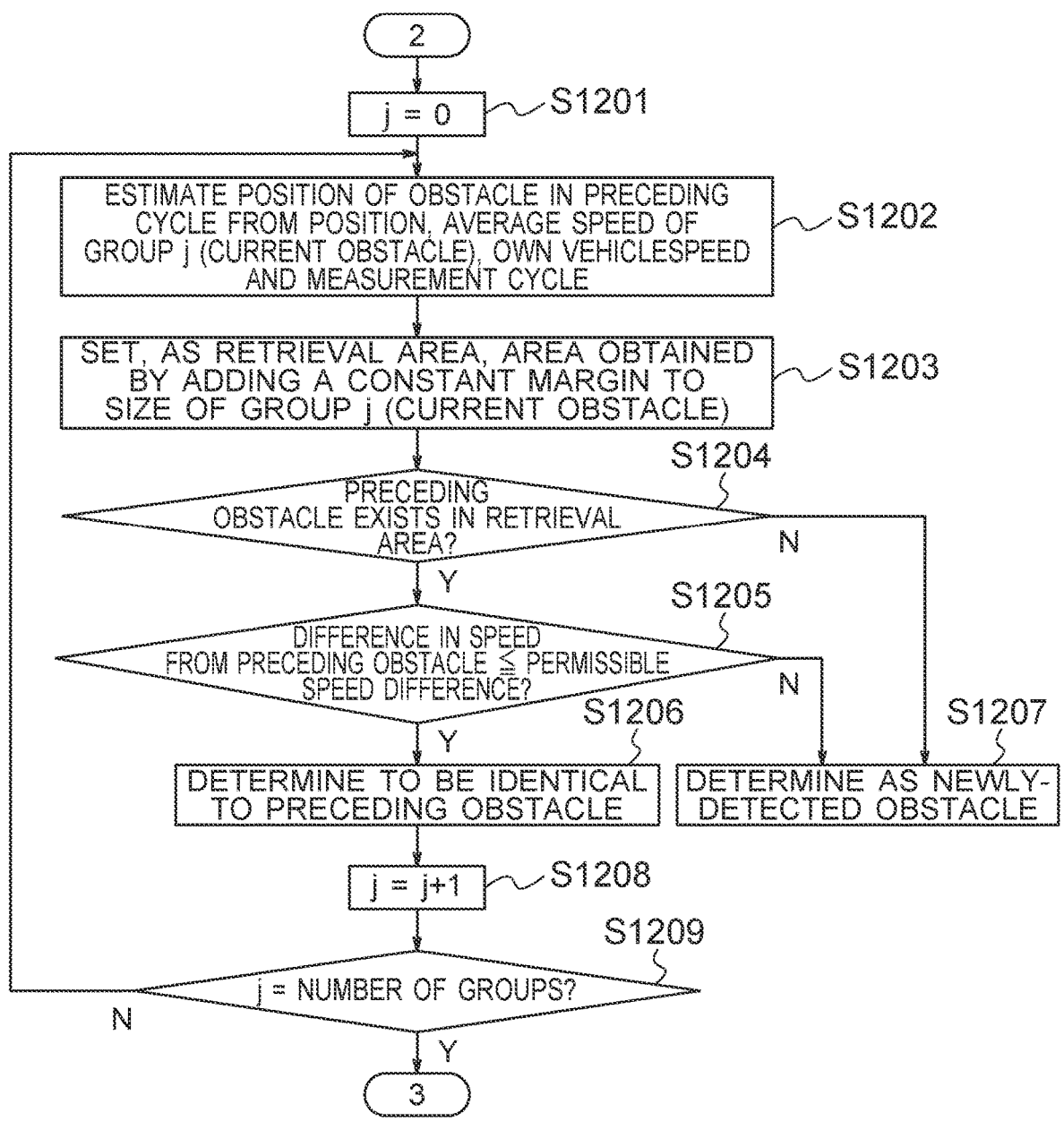

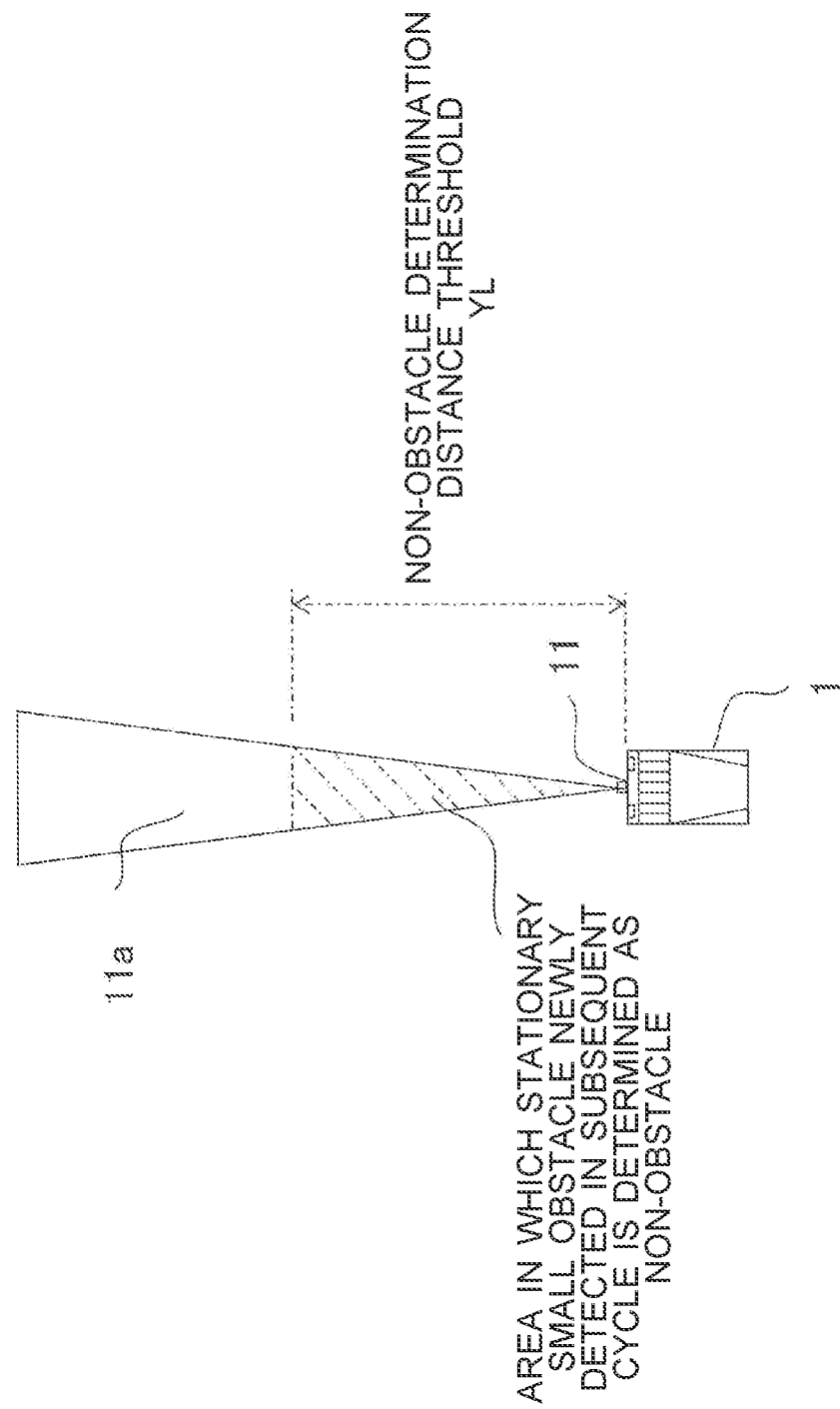

MINING WORK MACHINE

TECHNICAL FIELD

This invention relates to a mining work machine, and especially to a detection technology of its obstacle.

BACKGROUND ART

As a technology for detecting an obstacle located ahead of a vehicle, Patent Document 1, for example, discloses the following technology: "When an antenna rotates in a first direction, radar signals are transmitted and received at a first group of intermittent orientation angles by the antenna to generate a first group of beat signals having frequency differences of the transmitted and received radar signals, and, when the antenna rotates in a second direction opposite to the first direction, radar signals are transmitted and received at a second group of intermittent orientation angles, which is different from the first group of intermittent orientation angles, by the antenna to generate a second group of beat signals having frequency differences of the transmitted and received radar signals. Then, a first peak shape of the first group of beat signals and a second peak shape of the second group of beat signals are detected, and on the basis of a maximum value in the first peak shape and a maximum value in the second peak shape, the angle to a target is detected. It is, therefore, possible to avoid a reduction in the accuracy of detection of the angle to the target. (Extracted from the Abstract)".

PRIOR ART DOCUMENTS

Patent Document

Patent Document 1: JP 2011-002368 A

DISCLOSURE OF THE INVENTION

Problem to be Solved by the Invention

With the technology described in Patent Document 1, the existence or non-existence of an obstacle is determined from the peak values of the radar signals received by the antenna, and the type of the obstacle cannot be determined. If the technology described in Patent Document 1 is applied to a mining work machine traveling on a haul road constructed with an unpaved surface and waves reflected from an irregularity on a road surface are received and detected as an obstacle, the type of the obstacle is unknown so that the irregularity is also recognized as the obstacle, thereby involving a problem that a notification or warning to the effect that the obstacle has been detected is made although an evasive action such as slowing or stopping is not needed.

With the foregoing problem in view, the present invention has as an object thereof the provision of an obstacle detection technology suited for a mining work machine that travels on an unpaved road surface.

Means for Solving the Problem

To resolve the above-described problem, a mining work machine including: a periphery detection device that radially irradiates millimeter-waves forward in an traveling direction, receives reflected waves from a plurality of measurement points, and periodically detects positions of the measurement points and speeds of the measurement points relative to the mining work machine, and a speed sensor that detects a traveling speed of the mining work machine, wherein: the mining work machine further comprises an obstacle determination device that determines whether the obstacle candidate is a non-obstacle which would not interfere with traveling of the mining work machine; and the obstacle determination device comprises: a grouping processing section that puts the detected measurement points into a single group, in which the measurement points are located on the same obstacle candidate, if the detected measurement points are equal to or smaller than predetermined size thresholds equivalent in size to the mining work machine, a stationary/moving determination section that, based on the relative speeds of the obstacle candidate at the measurement points put into the group and the traveling speed of the mining work machine as detected in a current cycle, determines whether the obstacle candidate is a stationary object or a moving object, and a size determination section that determines a type of the obstacle candidate based on a result of a comparison between a size of the obstacle candidate associated with the measurement points put into the group by the grouping processing section and the predetermined size thresholds.

Advantageous Effects of the Invention

According to the present invention, there can be provided an obstacle detection technology suited for a mining work machine that travels on an unpaved road surface. Problems, configurations and effects other than those described above will become apparent from the following description of an embodiment.

BRIEF DESCRIPTION OF THE DRAWINGS

FIG. 12 is a flowchart illustrating a flow of continuous capture processing.

FIG. 14 is an explanatory diagram illustrating details of the processing for the determination of the stationary small obstacle or the stationary small non-obstacle.

MODES FOR CARRYING OUT THE INVENTION

An embodiment of the present invention will hereinafter be described in detail based on the drawings. Throughout the drawings that describe the embodiment, members having the same functions are identified by the same or related designations, and their repeated descriptions will be omitted. It is also to be noted that in the following embodiment, the description of the same or similar parts will not be repeated as a general rule unless specifically needed.

This embodiment will be described taking a mine dump truck as a mining work machine on which an obstacle determination device is mounted. The mining work machine is not limited to the dump truck, but may be a bulldozer, grader or sprinkler or a light vehicle that patrols haul roads at a mine.

Figure 1:
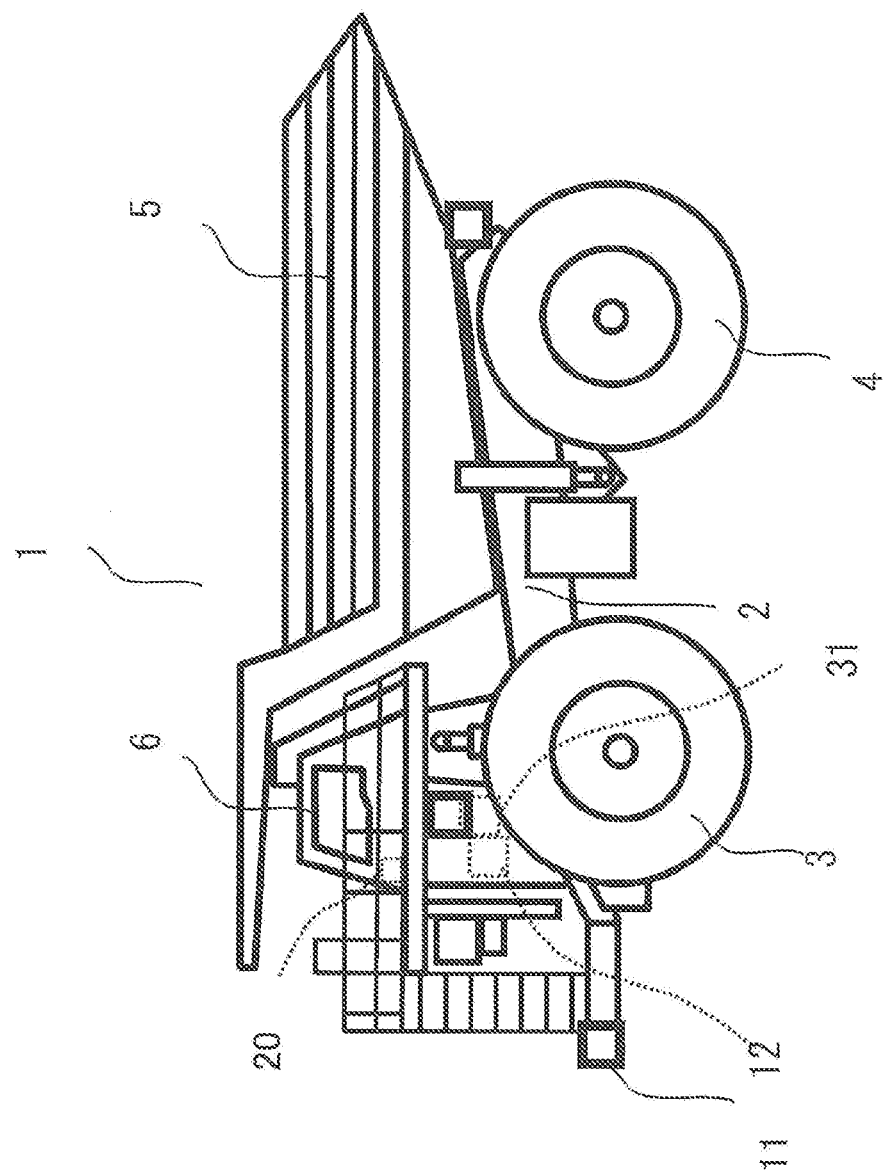
FIG. 1 is a left side view of a dump truck.
Figure 2:
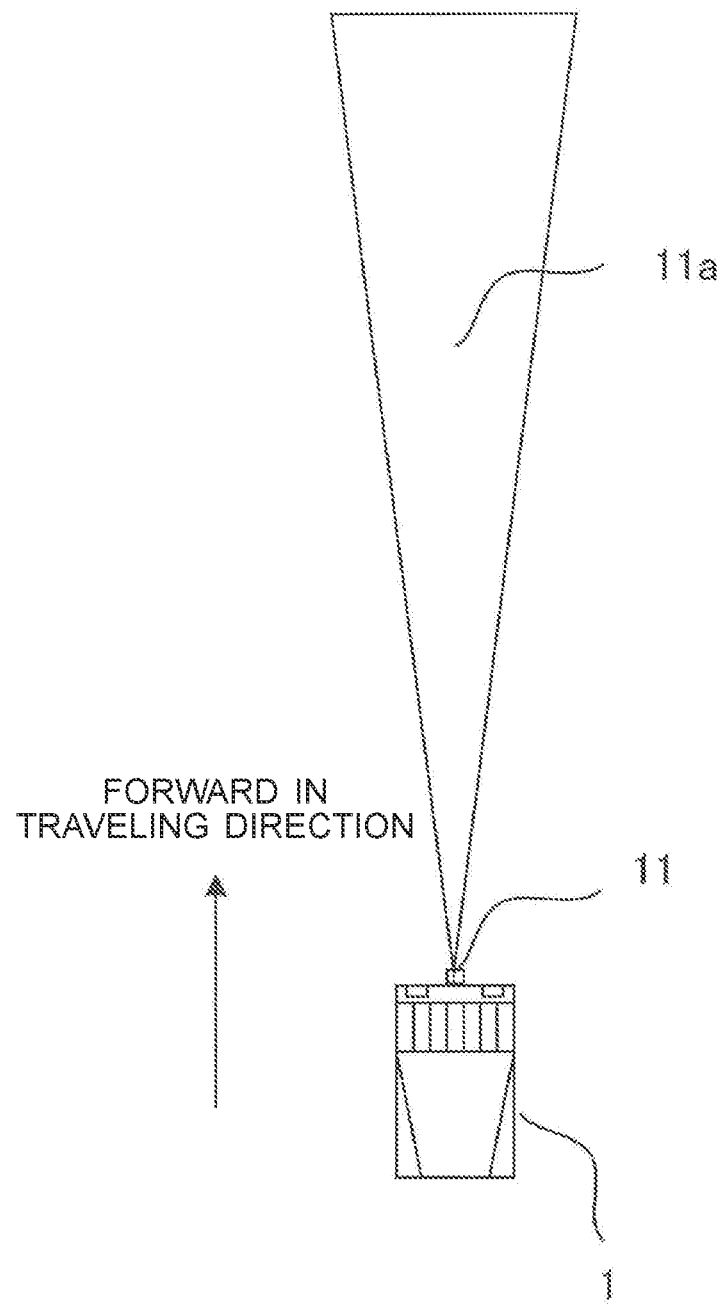
FIG. 2 is an explanatory diagram illustrating an example of a detection range of millimeter-wave radar.
Figure 3:
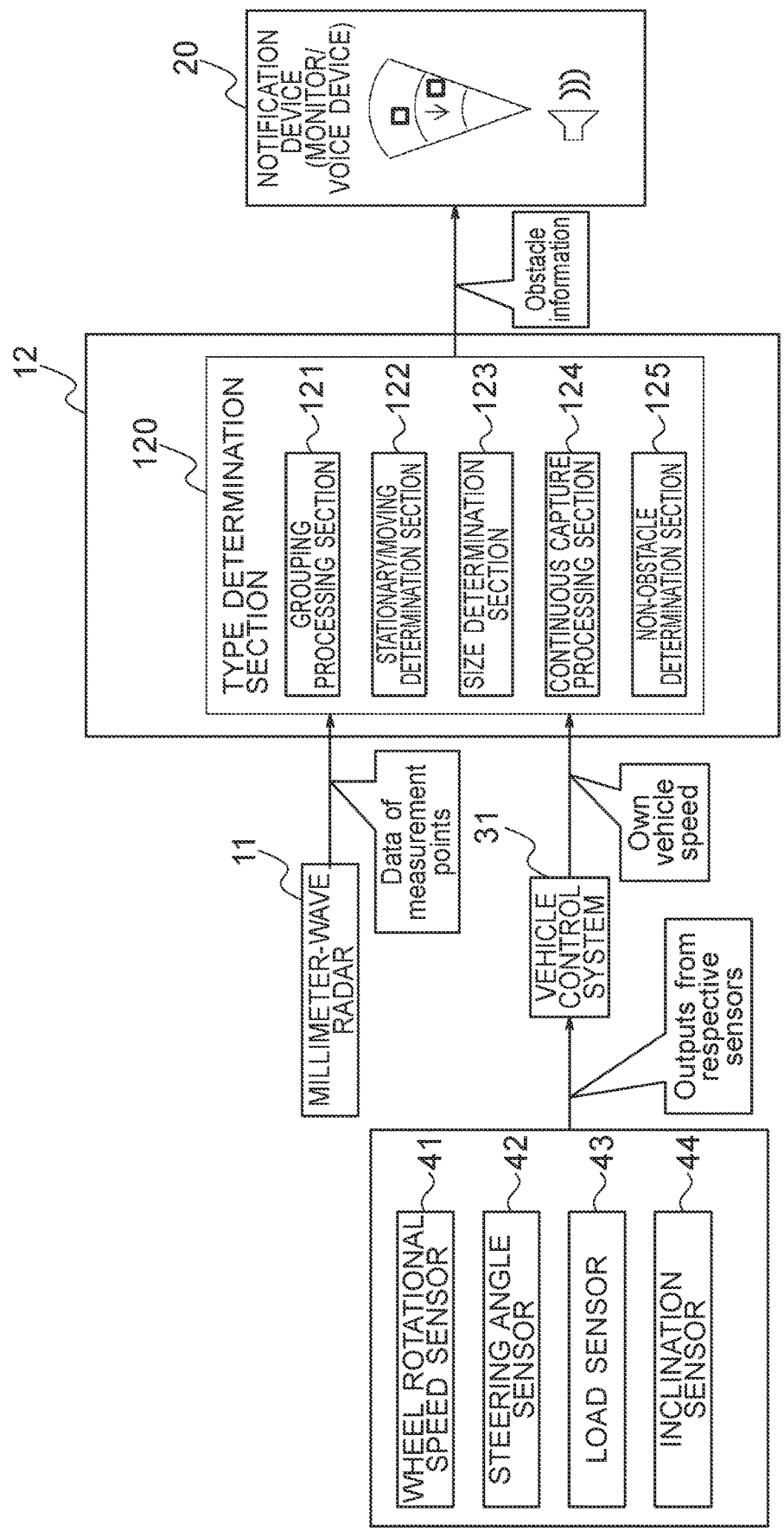
FIG. 3 is a block diagram illustrating a configuration example of the dump truck, which outputs determination results of an obstacle determination device to a monitor.

First, referring to FIG. 1 to FIG. 3, a description will be made of a schematic configuration of a dump truck according to this embodiment. FIG. 1 is a left side view of the dump truck. FIG. 2 is an explanatory diagram illustrating an example of a detection range of a millimeter-wave radar. FIG. 3 is a block diagram illustrating a configuration example of the dump truck, which outputs determination results of an obstacle determination device to a monitor.

The dump truck depicted in FIG. 1 and designated at reference numeral 1 is primarily provided with a body frame 2, front wheels 3, rear wheels 4, a vessel 5, and a cab 6. Provided inside the cab 6 is a notification device 20 that performs a notification on an obstacle to an operator of the dump truck 1, for example, a monitor or a sound device.

On a front wall of the body frame 2, a single long range millimeter-wave radar (hereinafter simply called "millimeter-wave radar") 11 is installed as a periphery detection device for the detection of obstacles. The millimeter-wave radar 11 is installed with its radiation surface directed forward ahead of the dump truck 1 to detect any obstacle existing ahead of the body of the dump truck 1. Therefore, the millimeter-wave radar 11 has a detection range 11a (see FIG. 2) configured as a region in which millimeter-waves spread radially forward in a traveling direction. The millimeter-wave radar 11 performs the detection of an obstacle by performing scanning with millimeter-waves and receiving reflected waves of the millimeter-waves. Hereinafter, the reflection points of the millimeter-waves will be called "measurement points", and the cycle from a scanning start point to a scanning endpoint with the millimeter-waves will be called "a single cycle of measurement". Further, a measurement cycle in which an obstacle candidate, which is an object for the below-described continuous capture processing, has been detected will be called "the current cycle", while a measurement cycle before the current cycle will be called "the preceding cycle". In addition, a measurement cycle after "the current cycle" will be called "the subsequent cycle".

The dump truck 1 is provided with an obstacle determination device 12 that determines the existence or non-existence and the type of an obstacle based on outputs from the millimeter-wave radar 11. The obstacle determination device 12 is characterized by determining whether an obstacle candidate outputted from the millimeter-wave radar 11 is a non-obstacle that would not interfere with traveling of the dump truck 1.

Also mounted on the dump truck 1 are various sensors (see FIG. 3) that output information on the body of the dump truck 1 such as, in addition to a speed of the dump truck 1, a steering direction, a payload weight, a gradient and a surface friction, and a vehicle control system 31 that outputs a brake-operating signal and a torque signal by using the information on the body of the dump truck 1. The obstacle determination device 12 and vehicle control system 31 may be configured by allowing coordination of hardware, which is provided with a central processing unit (CPU), a read only memory (ROM), a random access memory (RAM) and a hard disk drive (HDD), and software that realizes the respective functions of the obstacle determination device 12 and vehicle control system 31, or by using control circuits that realize the respective functions.

As the various sensors described above, there are provided sensors such as, for example, a wheel rotational speed sensor 41 that detects the rotational speed of a wheel (preferably, a driven wheel) of the dump truck 1, a steering angle sensor that detects the steering angle of the dump truck 1, a load sensor 43 that detects the stroke length of a suspension, and an inclination sensor that detects the inclination of the body of the dump truck 1. Each sensor is connected at an output stage thereof to an input stage of the vehicle control system 31.

Further, the obstacle determination device 12 is connected at an input stage thereof to output stages of the millimeter-wave radar 11 and vehicle control system 31, and the obstacle determination device 12 is connected at an output stage thereof to the notification device 20. The millimeter-wave radar 11 corresponds to the periphery detection device that periodically detects the relative speed of the obstacle candidate.

The vehicle control system 31 calculates an own vehicle speed based on an output of the wheel rotational speed sensor 41. Therefore, the wheel rotational speed sensor 41 corresponds to the speed sensor. The vehicle control system 31 also calculates a steering direction based on an output of the steering angle sensor 42, a payload weight based on an output of the load sensor 43, and a gradient based on an output of the inclination sensor 44 (the inclination of the body is considered to be its gradient). The vehicle control system 31 further calculates a surface friction based on an output of the wheel rotational speed sensor 41 and a torque signal that the vehicle control system 31 generates.

The obstacle determination device 12 is provided with a grouping processing section 121, a stationary/moving determination section 122, a size determination section 123, a continuous capture processing section 124, and a non-obstacle determination section 125. The grouping processing section 121 puts data of respective measurement points, which are outputted from the millimeter-wave radar 11, into a group consisting of a set of measurement points located on the same obstacle candidate. The stationary/moving determination section 122 determines whether the obstacle candidate is a stationary object or a moving object. The size determination section 123 determines from the size of the obstacle candidate whether the obstacle candidate is another mining work machine. The continuous capture processing section 124 determines if the obstacle candidate detected in the current measurement is identical to the obstacle candidate detected in the preceding measurement. The non-obstacle determination section 125 determines if the obstacle candidate is a non-obstacle that would not interfere with traveling of the dump truck 1. As the grouping processing section 121, stationary/moving determination section 122, size determination section 123, continuous capture processing section 124 and non-obstacle determination section 125 are configurational elements for determining the type of the obstacle candidate, they will be collectively called a "type determination section 120".

In FIG. 3, a monitor is used as the notification device 20, and the obstacle recognized by the obstacle determination device 12 is displayed on the screen of the monitor. As an alternative, a sound device may be provided as the notification device 20, and the results of the determination of the obstacle may be notified by a voice. The monitor corresponds to one aspect of an output section that outputs, as an obstacle, an obstacle candidate other than another obstacle candidate determined as a non-obstacle.

Figure 4:
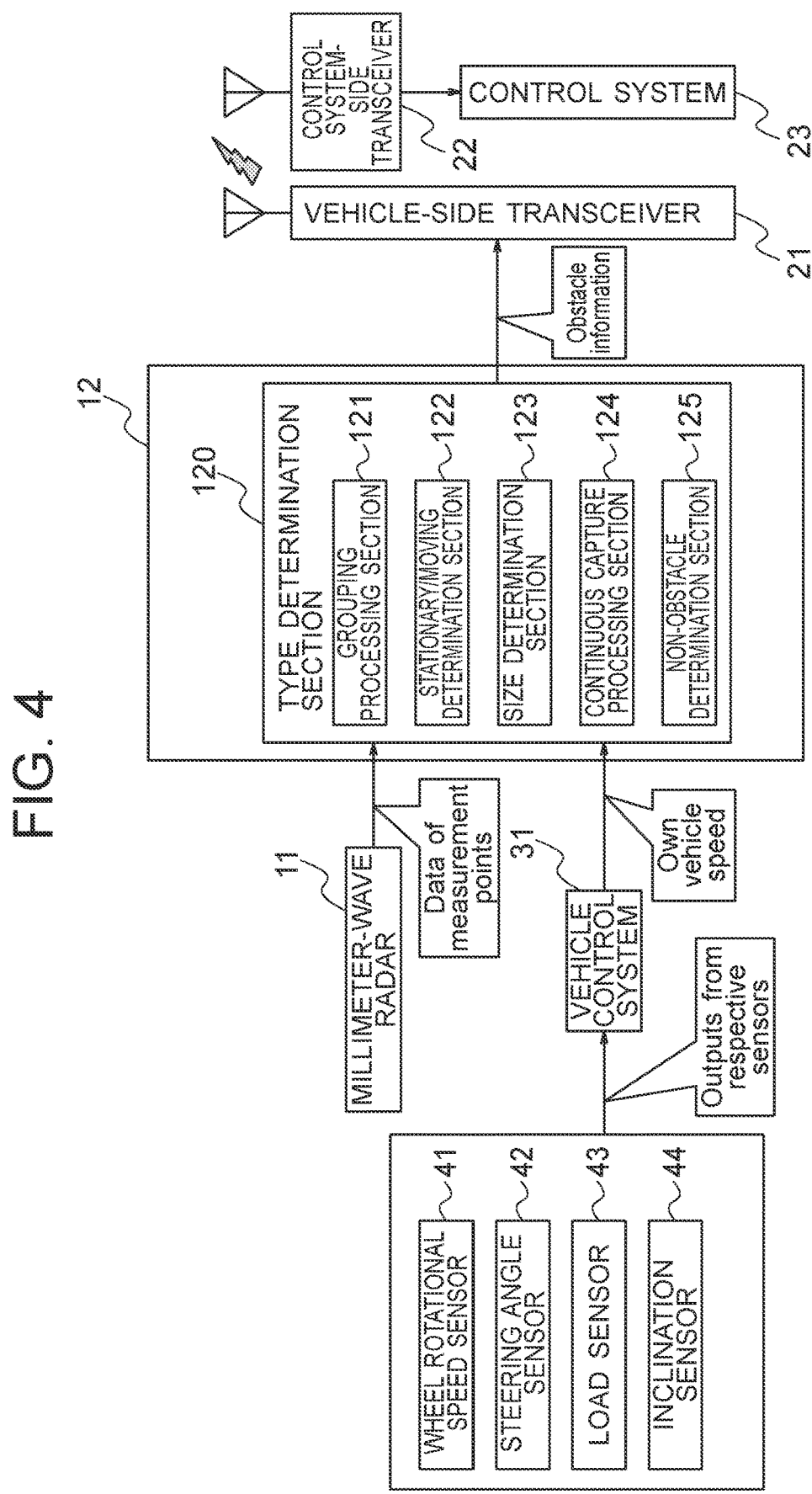
FIG. 4 is a block diagram illustrating a configuration example of the dump truck, which transmits determination results of the determination system to a control system.
Figure 5:
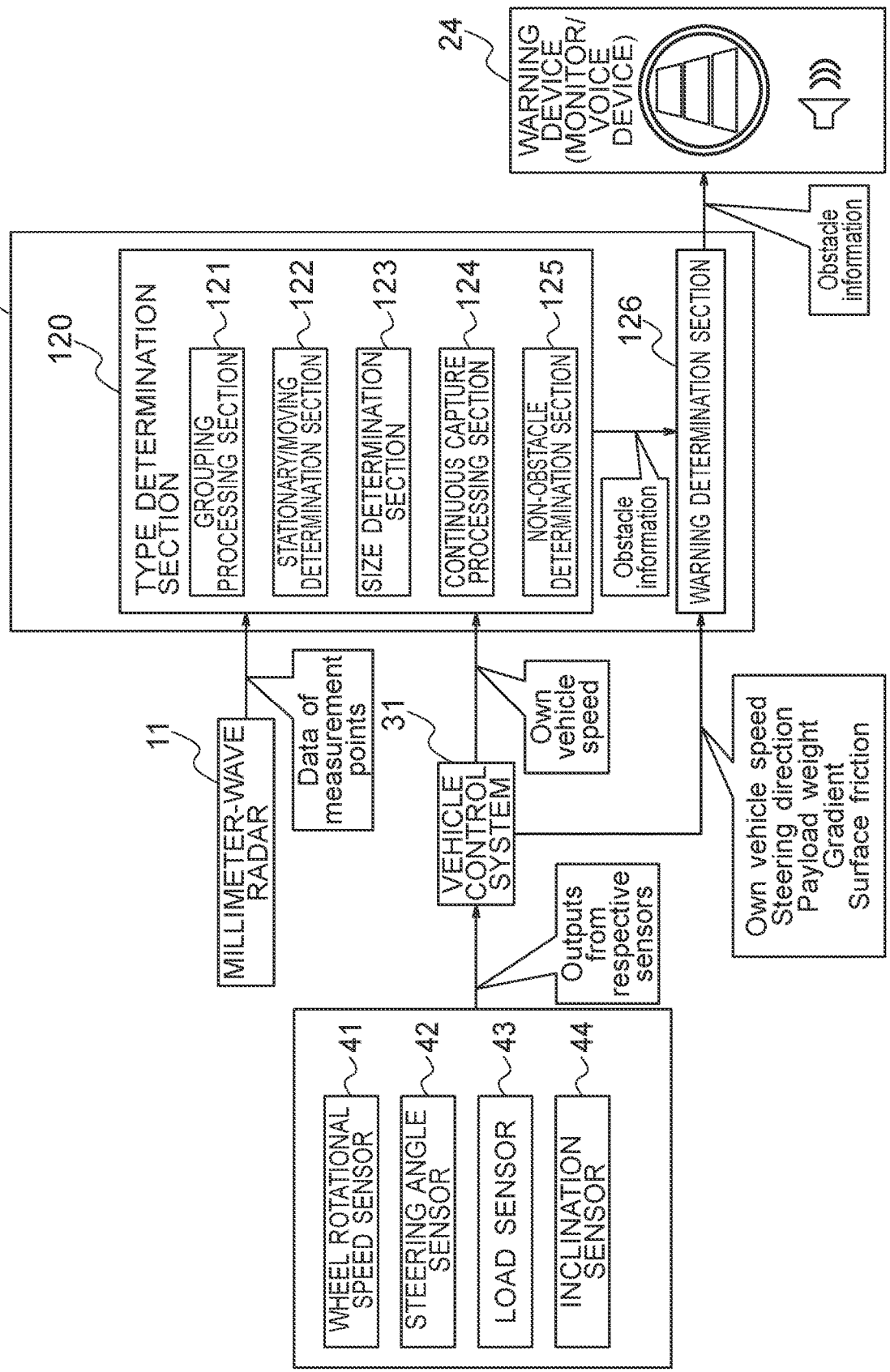
FIG. 5 is a block diagram of a configuration example of the dump truck, which outputs determination results of the determination system by using a warning commensurate with a risk level.
Figure 6:
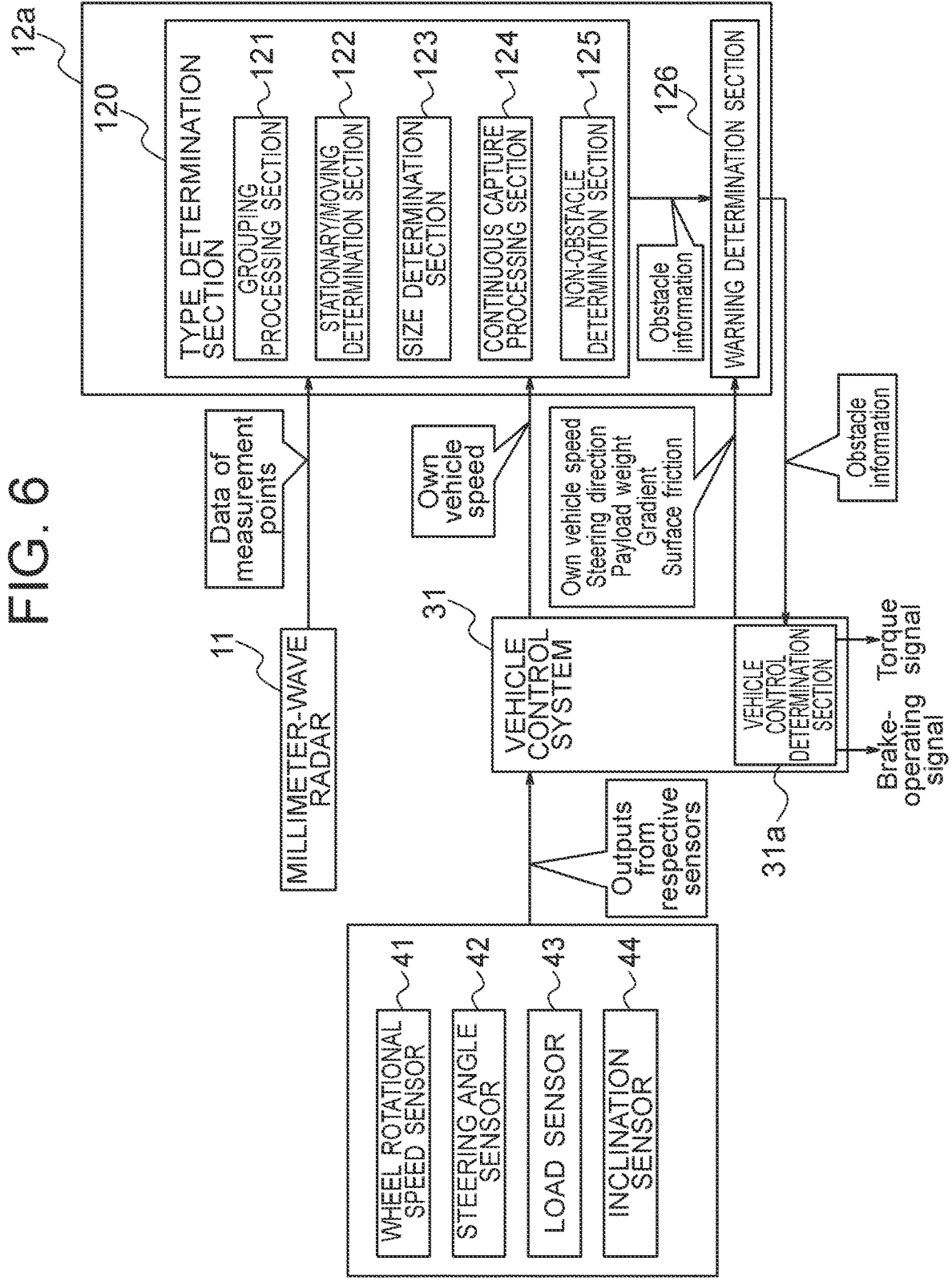
FIG. 6 is a block diagram of a configuration example of the dump truck, which outputs determination results of the determination system to a vehicle control device.

With reference to FIG. 4 to FIG. 6, a description will be made about another aspect of the output of the obstacle determination device. FIG. 4 is a block diagram illustrating a configuration example of a dump truck, which transmits the results of the determination system to a control system. FIG. 5 is a block diagram illustrating a configuration example of the dump truck, which outputs the results of the obstacle determination device by using a warning commensurate with a risk level. FIG. 6 is a block diagram illustrating a configuration example of the dump truck, which outputs the determination results of the determination system to the vehicle control device 31.

In the example of FIG. 4, the dump truck 1 is provided with a vehicle-side transceiver 21, and obstacle information, which indicates the results of a determination by the obstacle determination device 12, is outputted to the vehicle-side transceiver 21. Then, a control system-side transceiver 22 receives the determination results of the obstacle determination device 12 via wireless communication lines, and outputs the same to a control system 23. As a consequence, the information of the obstacle can be acquired at the control system 23.

In the example of FIG. 5, an obstacle determination device 12a is further provided with a warning determination section 126. In addition, a warning device 24 is provided in the cab 6. Based on the determination results obtained at the type determination section 120 and including the type of the obstacle, the steering direction (traveling direction) based on the own vehicle speed and steering angle, body information such as braking performance based on the payload weight, gradient and surface friction, and the position and relative speed of the obstacle, the warning determination section 126 determines the possibility of a collision by ascertaining if the obstacle exists on a traveling route on which the obstacle poses a risk of collision and also by calculating the time until the collision.

Then, the warning determination section 126 determines one of several warning levels according to the risk level (which corresponds to the level of collision possibility), and outputs the determined warning level to the warning device 24. The warning device 24 outputs a display image or a sound commensurate with the warning level. As a consequence, the operator of the dump truck 1 can perceive a warning that is commensurate with the warning level.

In the example of FIG. 6, the vehicle control system 31 is provided with a body control determination section 31a that outputs a brake-operating signal and a torque signal. Based on the results of warning determination as acquired from the warning determination section 126, the body control determination section 31a generates a brake-operating signal, and outputs the brake-operating signal to an unillustrated brake system to actuate the brake system, whereby maneuvers of the body of the dump truck 1 are automatically performed to reduce collision damage.

Figure 7:
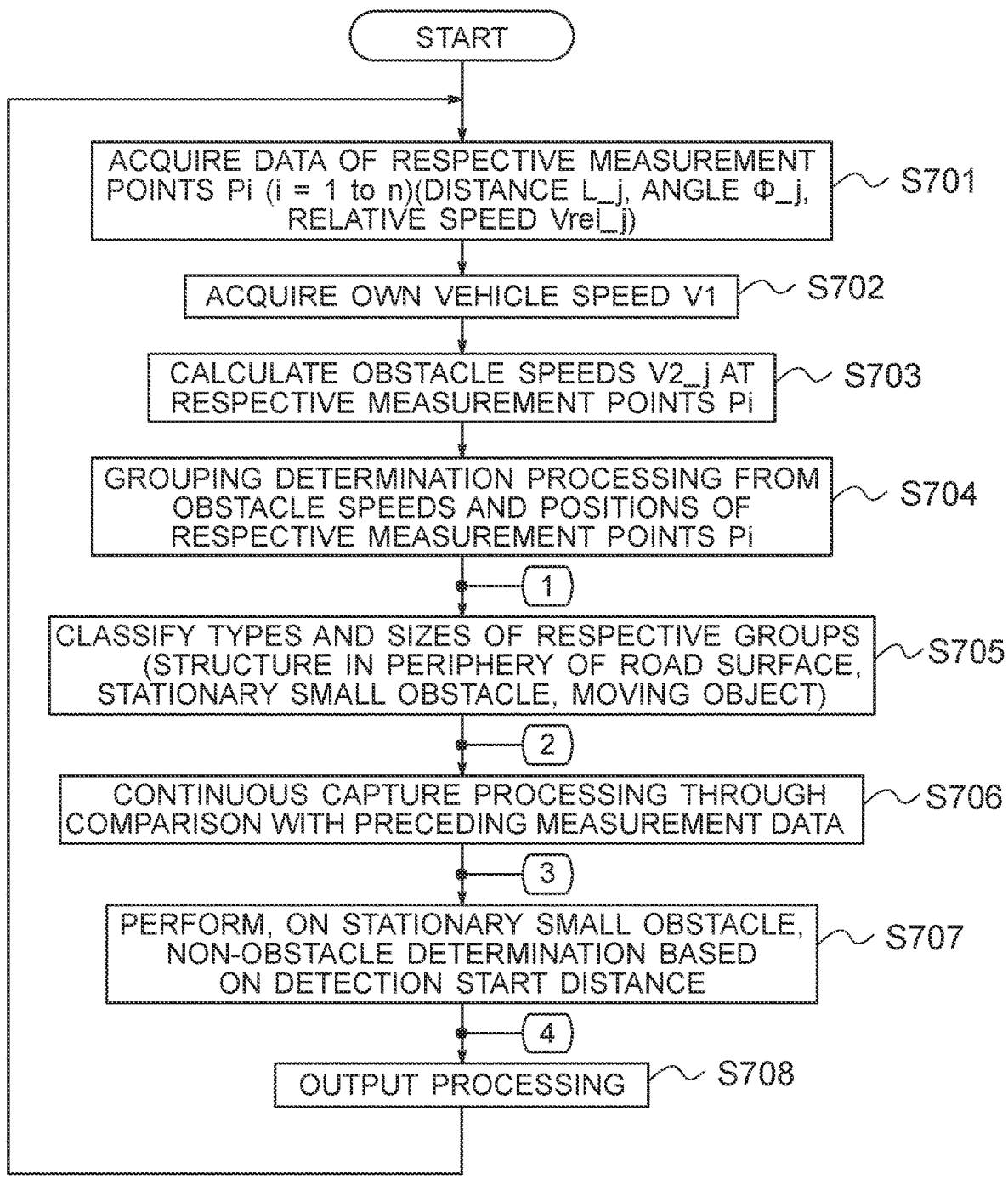
FIG. 7 is a flowchart illustrating a flow of processing at the obstacle determination device in this embodiment.

Referring to FIG. 7, a description will be made about operations of the obstacle determination device. FIG. 7 is a flow chart illustrating a flow of processing at the obstacle determination device in this embodiment.

From the millimeter-wave radar 11, the grouping processing section 121 of the obstacle determination device 12 acquires a distance L_i from the own vehicle to each measurement point Pi as calculated based on a reflected wave of a laser beam at the measurement point Pi, an irradiation angle $\phi i$ of the laser beam (the angle to each measurement point Pi as observed from the own vehicle), and a relative velocity Vrel_i of an obstacle. If measurement points are obtained as many as n in single cycle of scanning with millimeter-wave, n pieces of data of the measurement points are obtained (S$^{701}$).

The grouping processing section 121 acquires an own vehicle speed V1, which is a traveling speed of the dump truck 1, from the vehicle control system 31 (S702).

The grouping processing section 121 calculates actual obstacle speeds V2_i ("V2" will hereinafter be called "obstacle speeds") at respective measurement points Pi in accordance with the following formula (1) (S703).

$$V2\_i = V1 + Vrel\_i \quad (1)$$

Figure 8A:
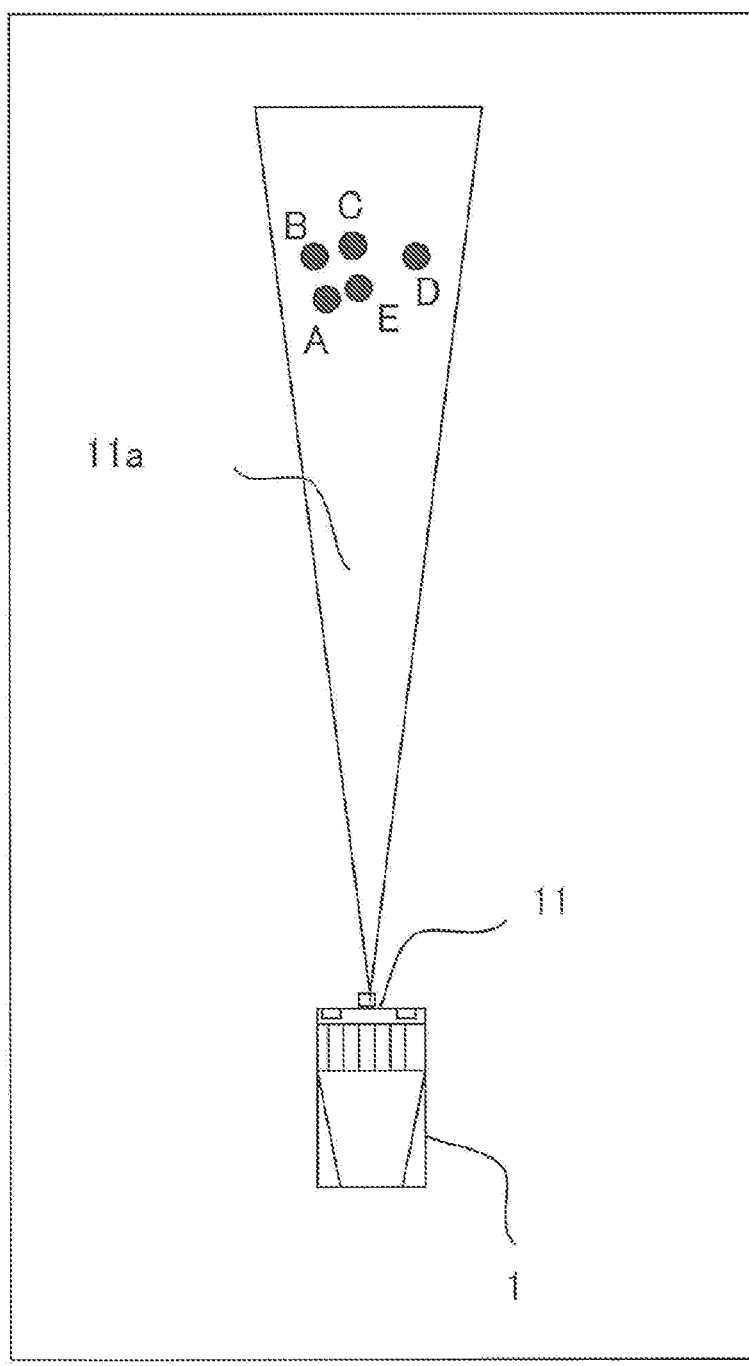
FIG. 8A is a diagram illustrating an example of distribution of measurement points A, B, C, D and E.
Figure 8B:
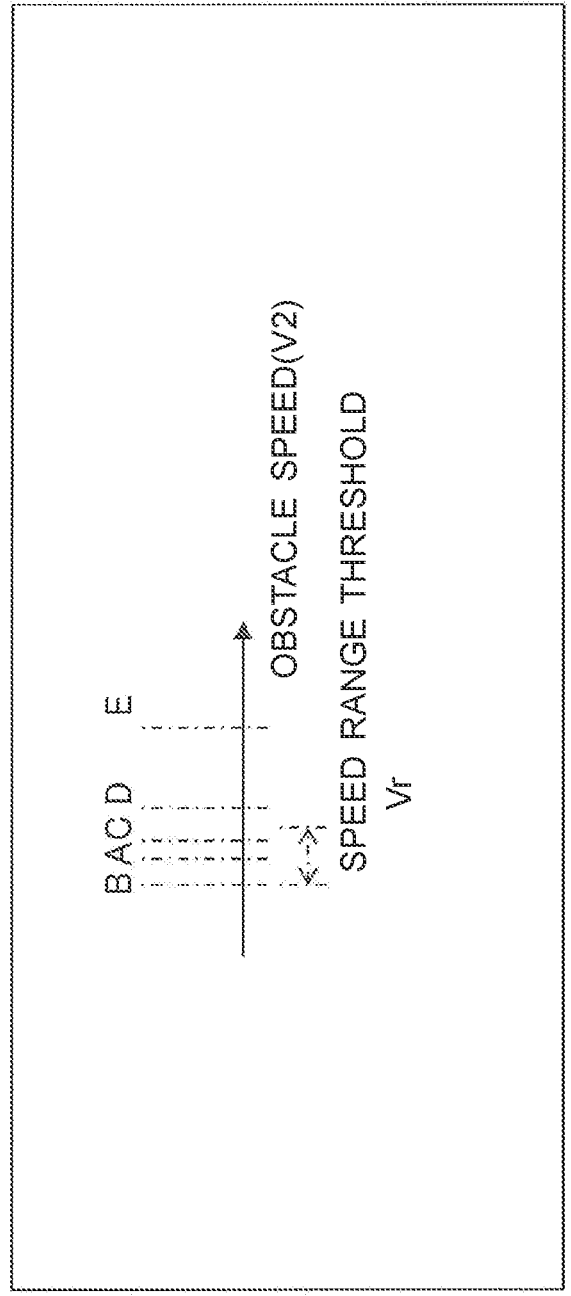
FIG. 8B is a diagram illustrating grouping determination processing using differences in obstacle speed.
Figure 8C:
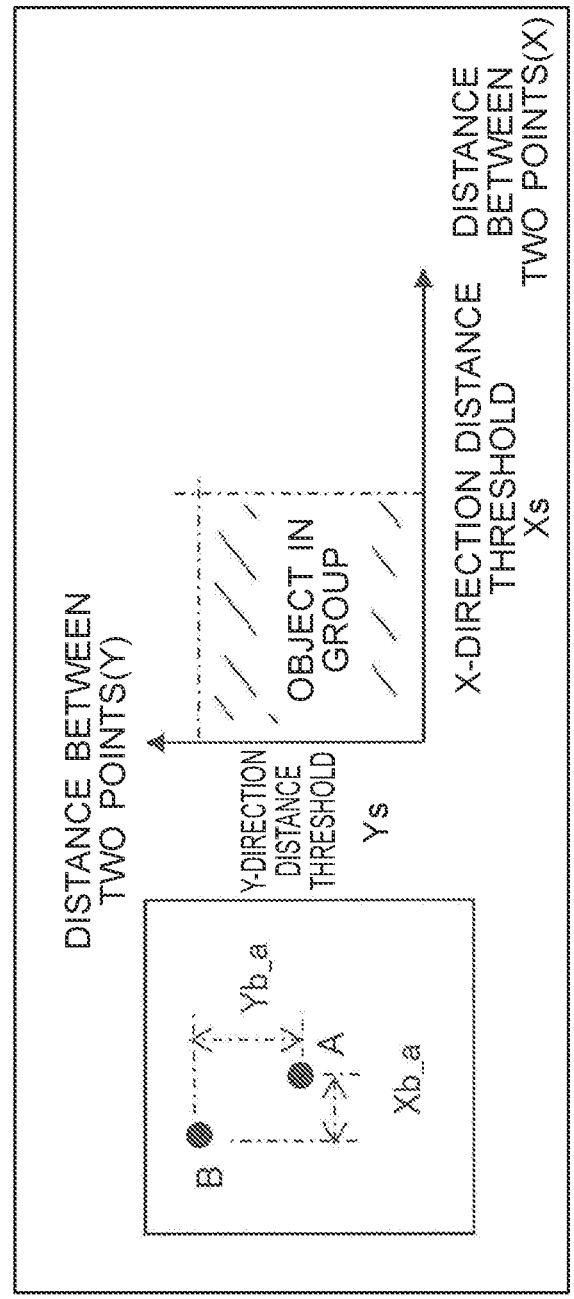
FIG. 8C is a diagram illustrating grouping determination processing using differences in distance.

V2_i: Obstacle speeds at measurement points Pi
V1: Own vehicle speed
Vrel_i: Relative speeds at measurement points Pi The grouping processing section 121 performs grouping determination processing based on the obstacle speeds V2_i and positions of the respective measurement points Pi (S704). The grouping determination processing is processing for recognizing, as the same group, measurement points consisting of reflection points located on the same object. With reference to FIGS. 8A to 8C, a description will hereinafter be made about grouping determination processing. FIG. 8A illustrates an example of distribution of measurement points A, B, C, D and E (hereinafter referred to as "the measurement points A to E"), FIG. 8B illustrates grouping determination processing using differences in obstacle speed, and FIG. 8C illustrates grouping determination processing using differences in distance.

As illustrated in FIG. 8A, the five measurement points A to E are assumed to exist in the detection range 11a. The grouping processing section 121 recognizes, as a single group, points fallen within a speed range threshold Vr set to recognize that the obstacle speeds V2 at the respective measurement points A to E are measurement points existing on the same obstacle. The speed range threshold Vr may be set based on differences in measured speed. In the example of FIG. 8B, the grouping processing section 121 determines differences in speed between the measurement points B and A, B and C, B and D, and so on, and determines there is a possibility that the measurement points A, B and C are measurement points on the same obstacle. The grouping processing section 121 repeats similar processing to form a group of plural points.

As another example of the grouping determination by the grouping processing section 121, if it is determined that as illustrated in FIG. 8C, the x-direction distance Xb_a and y-direction distance Yb_a between the measurement point A and the measurement point B are equal to or smaller than an x-direction distance threshold Xs and a y-direction distance threshold Ys, respectively, these two measurement points may be determined to be measurement points on the same obstacle. Here, the above-described distance thresholds may be defined as values obtained by adding a constant margin to the size of a largest mining work machine, for example, a mine dump truck traveling on the haul roads at the mine. Hereinafter, the set of measurement points recognized as a single group will be handled as a single obstacle candidate.

The type determination section 120 classifies the types and sizes of respective groups (S705). In this embodiment, each obstacle is classified into one of three types, that is, a structure in a periphery of a road surface, a stationary small obstacle and a moving machine.

Figure 9:
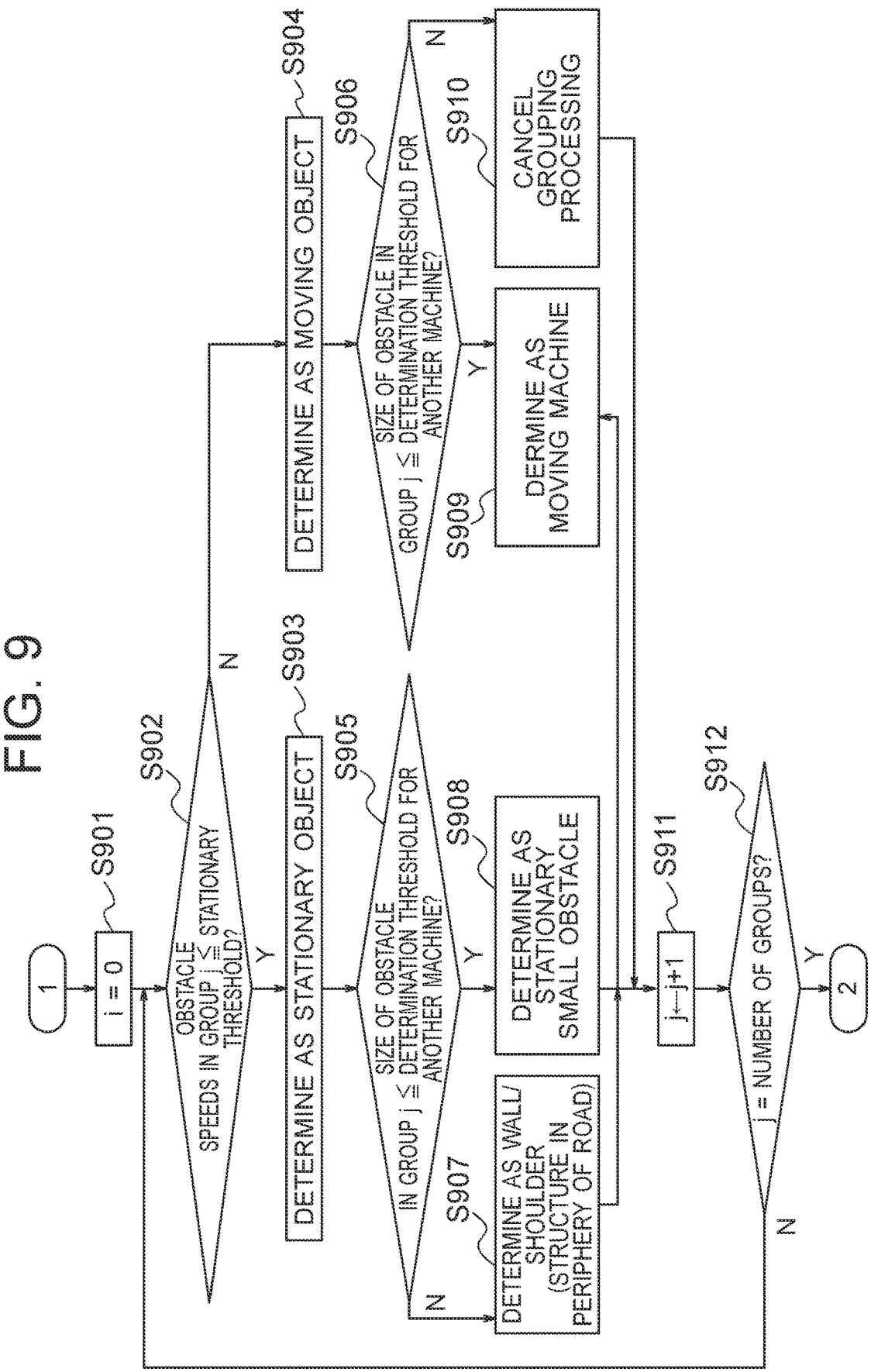
FIG. 9 is a flow chart illustrating a flow of stationary/moving and size determination processing.

Details of the processing in these steps will be described with reference to FIG. 9. FIG. 9 is a flow chart illustrating a flow of stationary/moving and size determination processing.

The stationary/moving determination section 122 selects a group j (j=0) as an object for type determination processing (S901), and compares obstacle speeds V2_j in the group j with a stationary threshold Vs_th for determining whether the obstacle is in a stationary state (S902). The stationary threshold Vs_th may be determined by taking the measurement accuracies of the millimeter-wave radar 11 and speed sensor into consideration. If the obstacle speeds V2_j in the group j are equal to or smaller than the stationary threshold Vs_th (S902/YES), the stationary/moving determination section 122 determines the obstacle in group j as a stationary object (S903).

If the obstacle speeds V2_j in the group j exceed the stationary threshold Vs_th (S902/NO), on the other hand, the stationary/moving determination section 122 determines the obstacle in the group j as a moving object (S904).

Figure 10A:
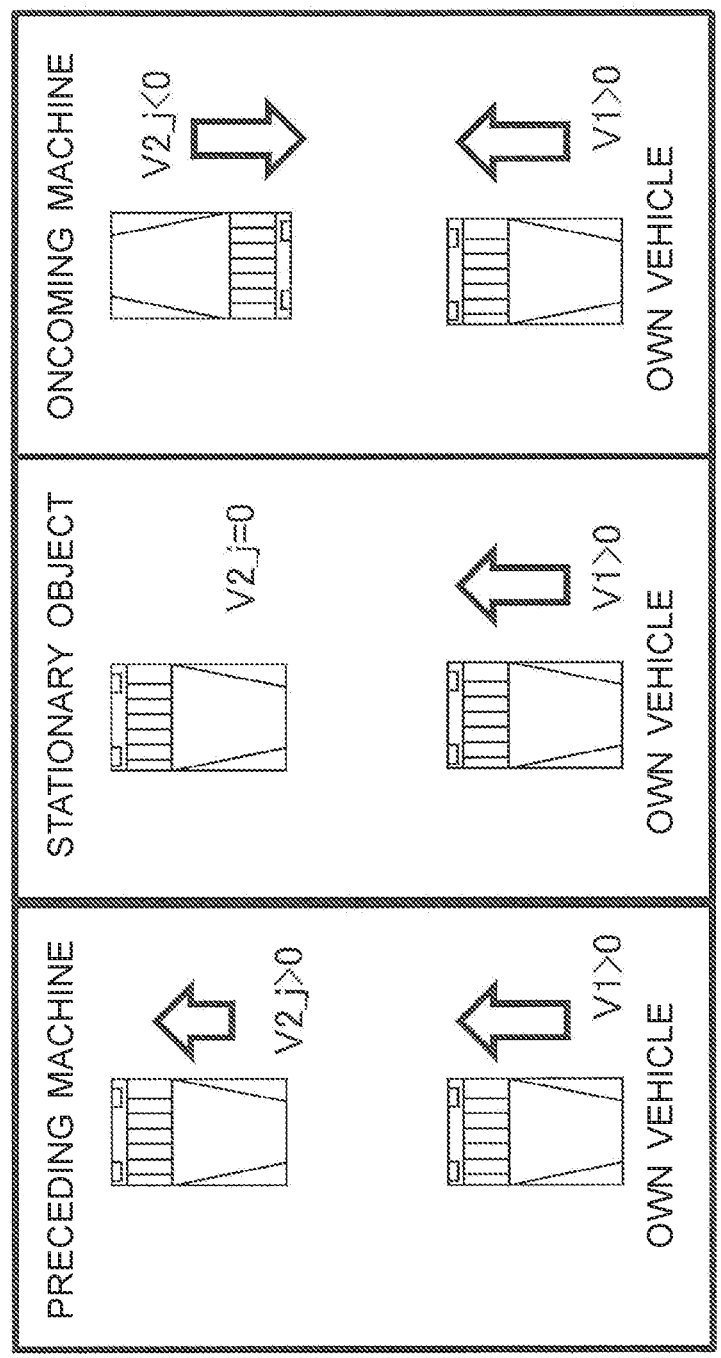
FIG. 10A is a diagram illustrating processing that determines only from actual obstacle speeds.
Figure 10B:
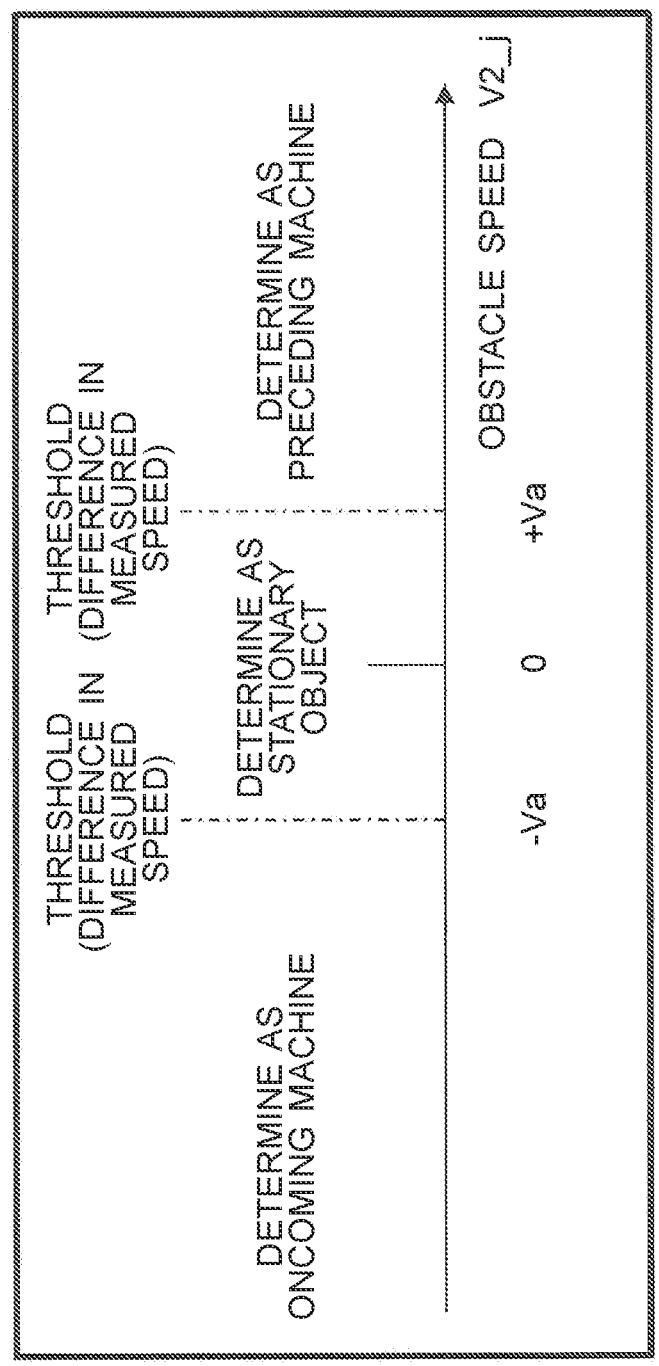
FIG. 10B is a diagram illustrating processing that takes differences in measurement speed into consideration.

Referring to FIG. 10A and FIG. 10B, a description will be made about the classification processing of the obstacle in each group into a stationary/moving object in step 902. FIG. 10A and FIG. 10B are explanatory diagrams of the classification processing of the obstacle in each group into a stationary/moving object, FIG. 10A illustrates processing that determines only from actual obstacle speeds, and FIG. 10B illustrates processing that takes differences in measured speed into consideration.

The stationary/moving determination section 122 calculates the obstacle speeds V2_j in accordance with the following formula (2).

$$V2\_j = V1 + Vrel\_j \quad (2)$$

V2_j: Average speed in the group j (obstacle speed)
V1: Own vehicle speed
Vrel_j: Relative speed of obstacle in the group j It is to be noted that the relative speed of the obstacle in the group j is the average value of relative speeds Vrel_i of the obstacle at the respective measurement points Pi recognized as the group j.

Subsequently, the stationary/moving determination section 122 compares the obstacle speed V2_j and the range of differences Va in measured speed in the group j, and classifies the obstacle into one of a preceding machine, a stationary object and an oncoming machine. If the own vehicle speed V1 of the own vehicle is assumed to be positive, the machine speed of the preceding machine, in other words, the obstacle speed V2_j is actually positive, the obstacle speed V2_j is actually 0 if the obstacle is a stationary object, or the obstacle speed V2_j is actually negative if the obstacle is an oncoming machine (FIG. 10A). In this embodiment, however, the stationary/moving determination section 122 determines the type of the obstacle in the group j by taking the differences Va (Va>0) in measured speed into consideration as represented by the following formula (3) and as illustrated in FIG. 10B.

Preceding machine if $V2\_j > Va$

Stationary object if $-Va \leq V2\_j < Va$

Oncoming machine if $V2\_j < -Va$ \quad (3)

Figure 11A:
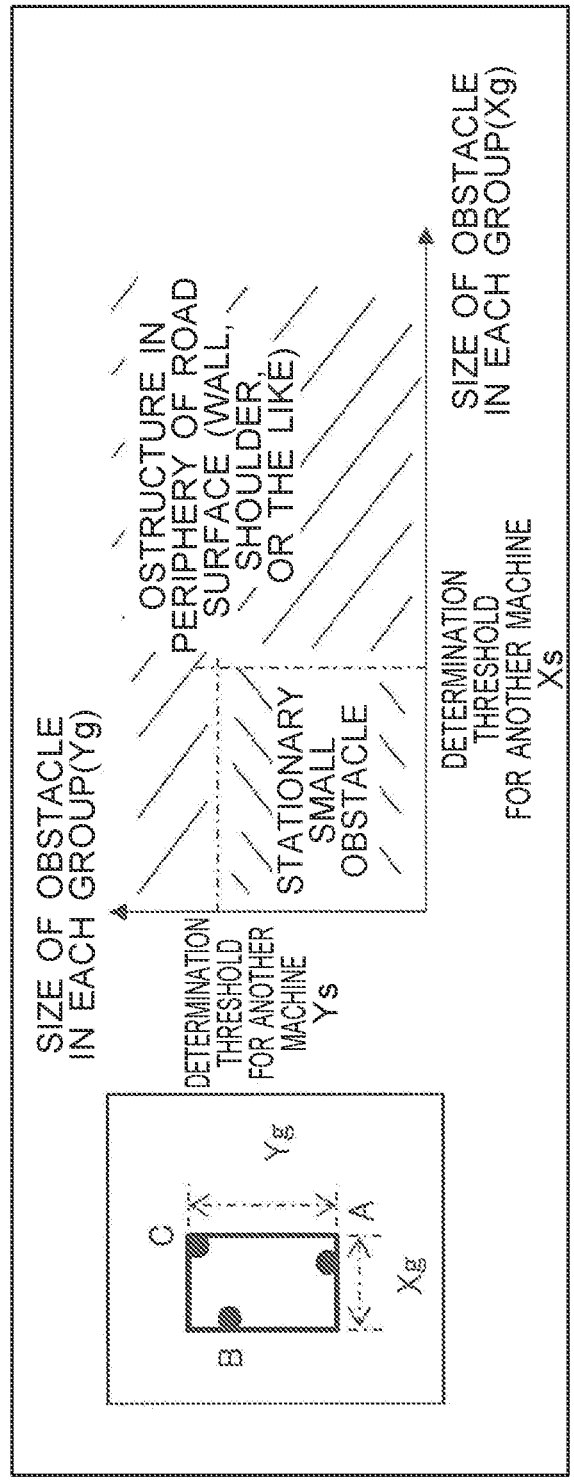
FIG. 11A is a diagram illustrating size determination processing for a stationary object.
Figure 11B:
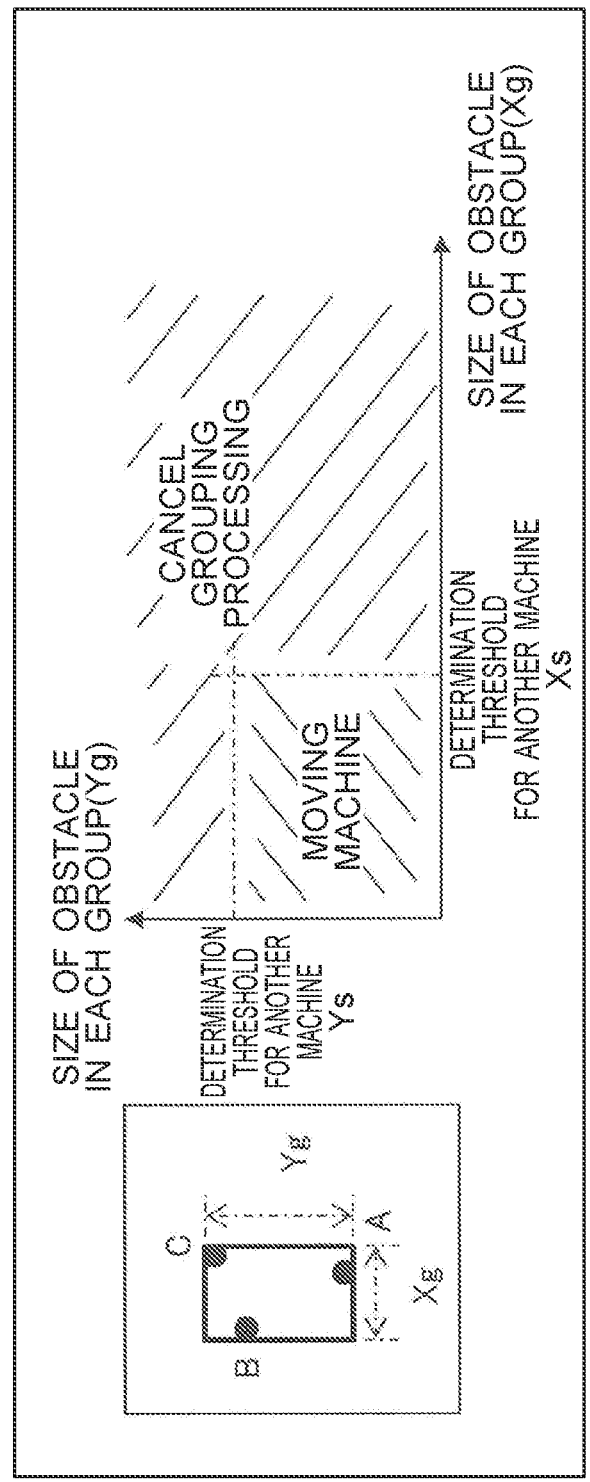
FIG. 11B is a diagram illustrating size determination processing for a moving object.

Next, the size determination section 123 determines the size of the obstacle in the group j (S905, S906). In this size determination processing, the size of the obstacle in the group is compared with the size of another mining work machine. Referring to FIG. 11A and FIG. 11B, a description will be made about the details of the size determination processing for the obstacle in the group. FIG. 11A illustrates processing for the size determination of a stationary object, and FIG. 11B illustrates processing for the size determination of a moving object.

As illustrated in FIG. 11A and FIG. 11B, the size of the obstacle in each group is defined by a distance Xg from the minimum x-coordinate (the x-coordinate of the measurement point B) to the maximum x-coordinate (the x-coordinate of the measurement point A) and the distance Yg from the minimum y-coordinate (the y-coordinate of the measurement point A) to the maximum y-coordinate (the y-coordinate of the measurement point C) among the coordinates of the measurement points included in the group. On the other hand, as the size of another mining work machine is already known, determination thresholds for that machine can be defined based on its dimensions (for example, a predetermined size range specified by the above-mentioned x-direction distance threshold Xs and y-direction distance threshold Ys). These thresholds may be determined by adding a margin, which includes a measurement error, to the size of a largest working machine, such as a dump truck, operating at the mine.

If the size of the obstacle in the group j determined as a stationary object satisfies Xg>Xs or Yg/Ys (S905/NO), the size determination section 123 then determines the obstacle as a structure such as a wall or shoulder in a periphery of a road surface (S907, see FIG. 11A). If Xg≤Xs and Yg≤Ys, on the other hand (S905/YES), the size determination section 123 determines the obstacle as a stationary small obstacle (S908, see FIG. 11A).

Similarly, if the size of the obstacle in the group j determined as a moving object satisfies Xg≤Xs and Yg≤Ys (S906/YES), the size determination section 123 determines that a single moving machine has been detected because there is no moving object other than the moving machine on the traveling route at the mine (S909, see FIG. 11B). If Xg>Xs or Yg/Ys despite of the moving object (S906/NO), on the other hand, the size determination section 123 determines that the plural measurement points on the moving object have not been correctly grouped because no working machine greater than the thresholds is supposed to exist, or that plural moving machines have been detected as superimposed, and outputs accordingly to the grouping processing section 121. The grouping processing section 121 cancels the grouping of measurement points in the group j (S910, see FIG. 11B).

After step 907, 908, 909 or 910, the size determination section 123 increments j by 1 (S911). If j becomes equal to the number of groups (S912/YES), the classification processing is determined to have been completed with respect to all the groups, and the processing proceeds to step 706 in FIG. 7. If the value obtained by incrementing j by 1 is smaller than the number of all the groups (S912/NO), the stationary/moving determination section 122 performs stationary/moving processing with respect to a new group j (S902).

Referring back to FIG. 7, the continuous capture processing section 124 performs continuous capture processing with respect to each group j through a comparison with the preceding measurement data (S706). With reference to FIG. 12, a description will be made about the continuous capture processing. FIG. 12 is a flow chart illustrating a flow of the continuous capture processing.

The continuous capture processing section 124 selects a group j (hereinafter called "the current obstacle") as an object for the processing (S1201), and from the position and average speed of the group j, the own vehicle speed V1 and the measurement cycle, calculates a detection position where the same obstacle as in the preceding cycle has been measured (S1202). The obstacle detected in the preceding cycle will hereinafter be called "the preceding obstacle".

By using the position of detection in the current cycle as a basis, the continuous capture processing section 124 sets a retrieval area, where in the preceding cycle, there is a possibility of detection of the same obstacle as in the current cycle, according to the distance range of a retrieval area set beforehand based on the own vehicle speed (S1203).

If there is the preceding obstacle in the retrieval area (S1204/YES) and if the difference in speed between the preceding obstacle and the current obstacle is equal to or smaller than a permissible speed difference set for the determination of identicalness with the current obstacle (S1205/YES), the continuous capture processing section 124 determines that the current obstacle and the preceding obstacle are identical to each other (S1206). Because information such as the position, size and speed of an obstacle may involve variations in detection results, the continuous capture processing section 124 may average this information or smoothen it through a Kalman filter or the like upon determination of the identicalness.

The continuous capture processing section 124 then increments j by 1 (S1208). If j becomes equal to the number of groups (S1209/YES), the continuous capture processing has been completed with respect to all the groups, and the processing proceeds to step 707.

If the preceding obstacle does not exist in the retrieval area (S1204/NO) or if the difference in speed between the current obstacle and the preceding obstacle does not fall within the speed range threshold (S1205/NO), the current obstacle is determined to be a newly detected obstacle (S1207), and subsequent to recording of the detection start position, the processing proceeds to step 1208.

Figure 13:
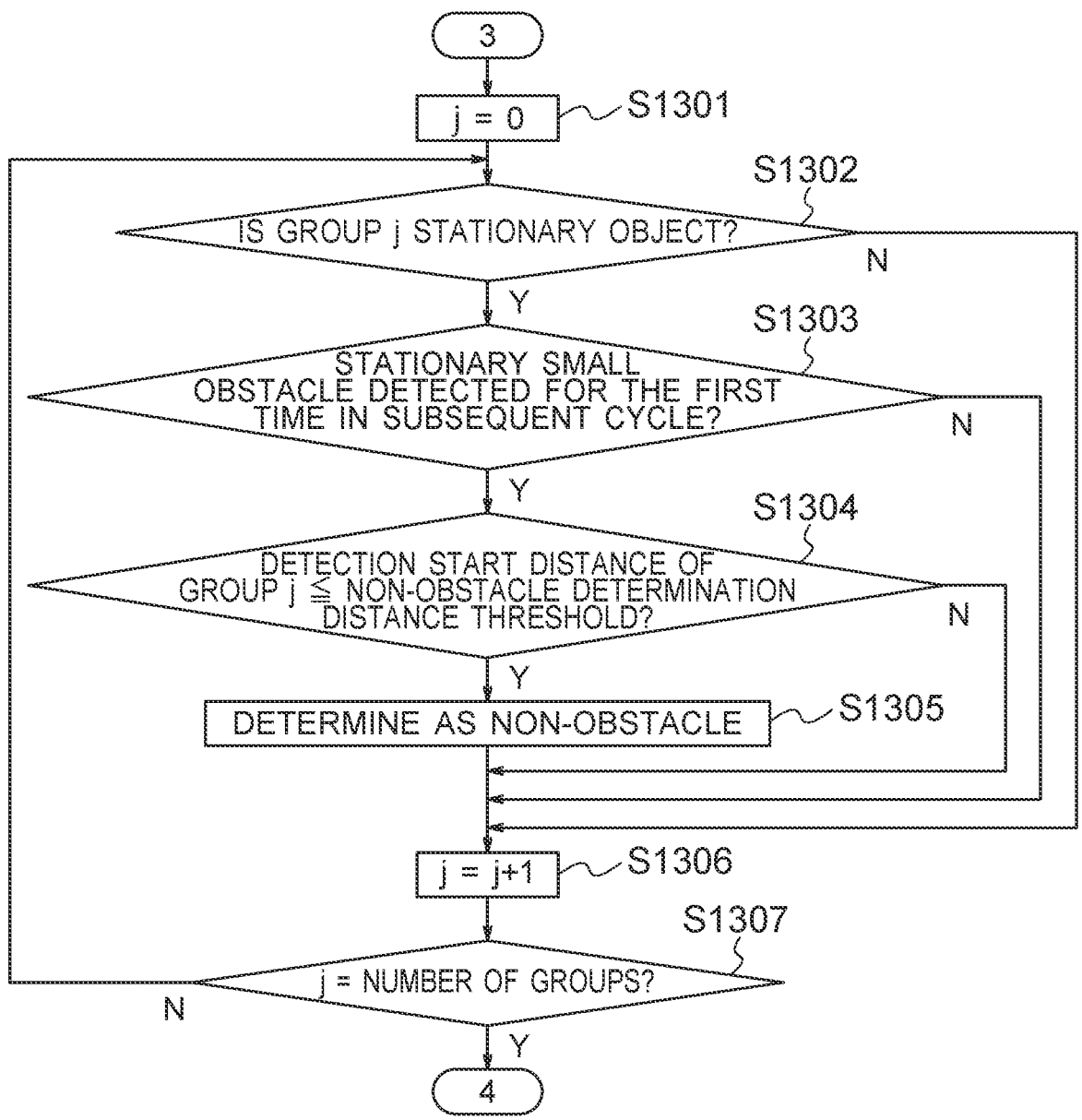
FIG. 13 is a flow chart illustrating a flow of processing for the determination of a stationary small obstacle or a stationary small non-obstacle.

The non-obstacle determination section 125 performs, on a stationary object, a non-obstacle determination based on a detection start distance (S707). In other words, because the stationary small obstacle has not been determined in step S908 as to whether it is an obstacle or a non-obstacle, processing is performed to make a determination in this respect. Hereinafter, with reference to FIG. 13 and FIG. 14, a description will be made about processing for the determination of a stationary small obstacle or a stationary small non-obstacle. FIG. 13 is a flow chart illustrating a flow of the processing for the determination of the stationary small obstacle or the stationary small non-obstacle. FIG. 14 is an explanatory diagram illustrating details of the processing for the determination of the stationary small obstacle or the stationary small non-obstacle.

The non-obstacle determination section 125 selects a first obstacle group j (i=0) as an object for determination processing (S1301). If the group j is determined to be a stationary object (S1302/YES), if based on the results of a determination by the size determination section 123, the stationary object is a stationary small obstacle candidate detected for the first time in the subsequent cycle (S1303/YES), and if the detection start distance of the group j is equal to or smaller than a non-obstacle determination distance threshold YL set based on a maximum distance at which reflected waves from an obstacle smaller than the working machine can be received (S1304/YES), the non-obstacle determination section 125 determines the group j as a non-obstacle (S1305). If determined as the non-obstacle, the group j can be excluded, in later-stage processing, from an object for displaying or warning (step 708 in FIG. 7).

A non-obstacle means an obstacle candidate that is not strong in the intensity of reflected waves unlike a mining work machine but is weaker in reflection intensity than the mining work machine, and is primarily an irregularity of a road surface. The irregularity of the road surface is weak in the reflection of millimeter-wave from millimeter-wave radar, and therefore has a characteristic that it is detected for the first time after having traveled closer thereto in comparison with the mining work machine. A stationary small obstacle and a non-obstacle can, therefore, be distinguished from each other, for example, by setting beforehand a non-obstacle determination distance threshold YL, which is shorter than a detection start distance for a mining work machine and at which a non-machine, stationary small obstacle, for example, the irregularity or the like of the road surface is begun to be detected, and comparing the detection start distance of the group j with the non-obstacle determination distance threshold YL, as illustrated in FIG. 14.

The non-obstacle determination section 125 increments j by 1 (S1306). If j becomes equal to the number of groups (S1307/YES), the type determination processing based on the detection start distance has been completed with respect to all the groups, and the processing proceeds to step 708.

If the obstacle in the group j is not a stationary object (S1302/NO) or is not a newly-detected obstacle (S1303/NO) or if the detection start distance for the group j exceeds the non-obstacle determination distance threshold (S1302/NO), the processing proceeds to step 1306.

By the processing described above, the type determination section 120 determines the type of the obstacle, and outputs obstacle information that excludes any non-obstacle (step 708). In the obstacle information, the distance to the obstacle may also be included in addition to the type of the obstacle. Based on the obstacle information, it is then possible at the notification device 20 to change the display contents to the operator and/or at the warning determination section 126 to determine the possibility of a collision and to output a warning commensurate with the risk level.

According to this embodiment, a decision of the operator can be assisted by determining the type of the obstacle based on the output of the millimeter-wave radar and the body information of the own vehicle and notifying it to the operator. Here, it is possible not to notify a non-obstacle, which would not interfere with traveling, as an obstacle, and therefore unnecessary notifications can be decreased. In particular, an unpaved road surface includes surface irregularities, but the fault detection of these irregularities as obstacles can be decreased.

The embodiment of the present invention has been described above. However, the present invention shall not be limited to the above-described embodiment, and any design changes or the like thereto within the scope not departing from the spirit of the present invention shall be encompassed by the present invention.

For example, the load sensor 43 is not essential. Information that indicates a payload weight may be obtained from a loading machine that performs loading work to a dump truck, and with the own weight added thereto, may then be inputted to the warning determination section.

Further, gradients of a road surface can be measured beforehand based on the landform. It is, therefore, possible to configure so that by writing these gradients together with the corresponding position information in map information and making a reference to the map information in the course of traveling of the dump truck, the gradient of the road surface at the current position can be acquired.

LEGENDS

1: dump truck, 11: millimeter-wave radar, 11a: detection range of millimeter-wave radar, 12: obstacle determination device, 20: notification device, 31: vehicle control system.

The invention claimed is:

1. A mining work machine including:
   a periphery detection device that radially irradiates millimeter-waves forward in a traveling direction, receives reflected waves from a plurality of measurement points, and periodically detects positions of the measurement points and speeds of the measurement points relative to the mining work machine, and
   a speed sensor that detects a traveling speed of the mining work machine, wherein:
   the mining work machine further comprises an obstacle determination device that determines whether an obstacle candidate is a non-obstacle which would not interfere with traveling of the mining work machine; and
   the obstacle determination device comprises: a grouping processing section that puts the detected measurement points into a single group, in which the measurement points are located on the same obstacle candidate, if the detected measurement points are equal to or smaller than predetermined size thresholds equivalent in size to the mining work machine,
   a stationary/moving determination section that, based on the relative speeds of the obstacle candidate at the measurement points put into the group and the traveling speed of the mining work machine as detected in a current cycle, determines whether the obstacle candidate is a stationary object or a moving object, and
   a size determination section that determines a type of the obstacle candidate based on a result of a comparison between a size of the obstacle candidate associated with the measurement points put into the group by the grouping processing section and the predetermined size thresholds.

2. The mining work machine according to claim 1, further comprising:
   a continuous capture processing section that determines the obstacle candidate, which has been determined to be the stationary object by the stationary/moving determination section, as a stationary small obstacle candidate if the former obstacle candidate is equal to or smaller than the size thresholds, or as a structure in a periphery of a road surface if the former obstacle candidate is greater than the size thresholds, and that by using a position of detection in the current cycle as a basis, sets a retrieval area, where there is in a preceding cycle a possibility of detection of the stationary small obstacle candidate based on a position of the stationary small obstacle candidate, according to the distance range based on the traveling speed of the mining work machine, and determines whether the same stationary small obstacle candidate as the stationary small obstacle candidate in the current cycle has been detected in the retrieval area in the preceding cycle,
   a non-obstacle determination section that determines a stationary small obstacle candidate, which has been detected for the first time in a subsequent cycle, as a non-obstacle if a position of detection of the stationary small obstacle candidate detected for the first time in the subsequent cycle is equal to or smaller than a non-obstacle determination distance threshold set based on a maximum distance at which reflected waves from an obstacle smaller than the mining work machine can be received, and
   an output device that outputs, as an obstacle, the obstacle candidate other than the obstacle candidate, which has been determined as the non-obstacle, among the obstacle candidates detected by the periphery detection device.

3. The mining work machine according to claim 1, wherein:
   the size determination section determines the obstacle candidate, which has been determined to be the moving object by the stationary/moving determination section, as a moving machine if the obstacle candidate is equal to or smaller than the size thresholds, or, if the obstacle candidate is greater than the size thresholds, cancels by the grouping processing section the grouping of the measurement points on the obstacle candidate and determines that plural moving machines have been detected as superimposed.

\* \* \* \* \*